(No Model.)
F. J. PATTEN.
DISTRIBUTION OF ELECTRIC CURRENTS.
No. 418,655. Patented Dec. 31, 1889.
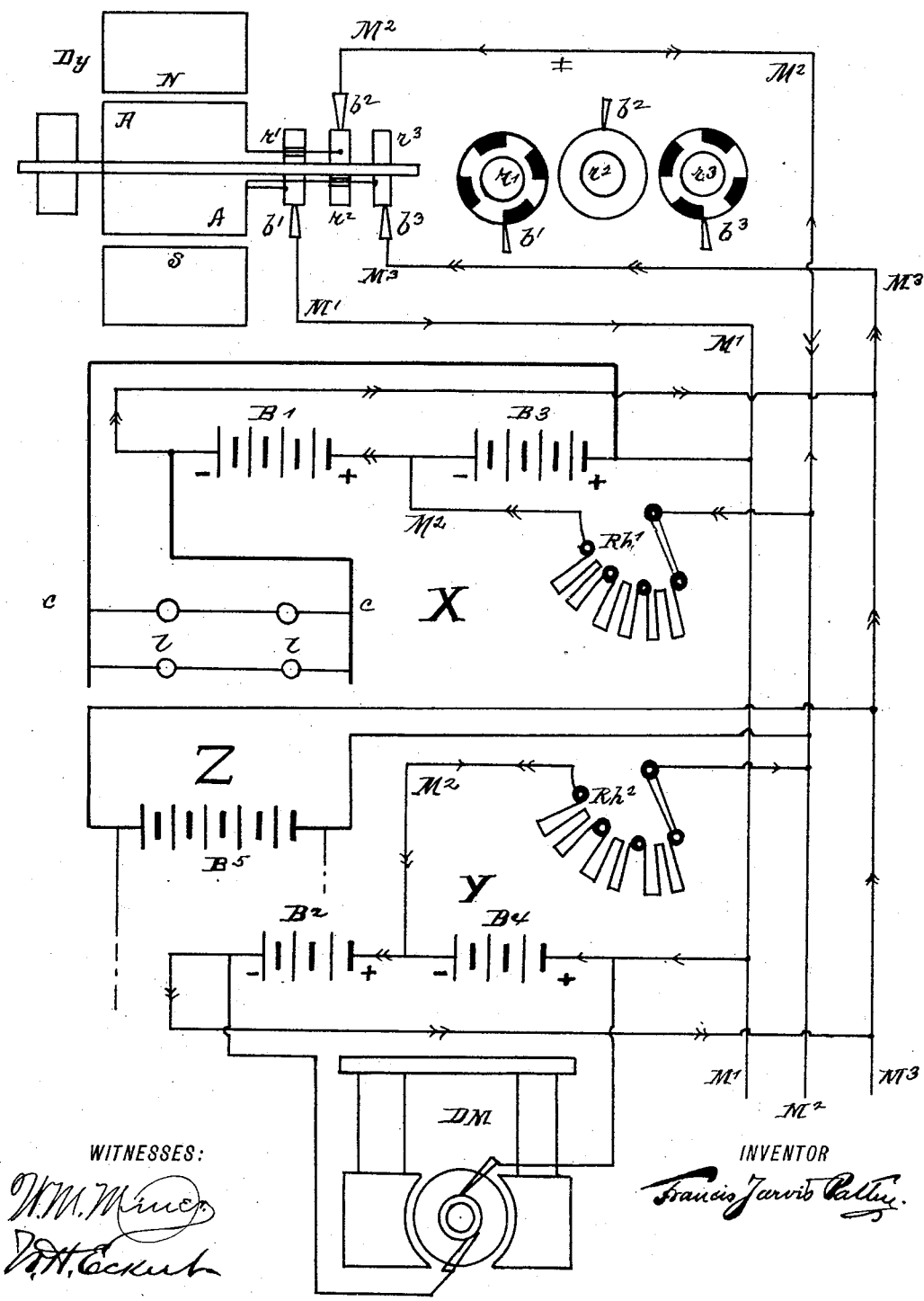
WITNESSES:
INVENTOR
Francis Jarvis Patten.

UNITED STATES PATENT OFFICE.

FRANCIS JARVIS PATTEN, OF NEW YORK, N. Y.

DISTRIBUTION OF ELECTRIC CURRENTS.

SPECIFICATION forming part of Letters Patent No. 418,655, dated December 31, 1889.

Application filed November 30, 1889. Serial No. 332,094. (No model.)

*To all whom it may concern:*

Be it known that I, FRANCIS JARVIS PATTEN, a citizen of the United States, residing in the city, county, and State of New York, have invented certain new and useful Improvements in the Distribution of Electric Currents, of which the following is a description.

Referring to the accompanying drawing, the figure presents a general view of the system by diagram of the various circuits and operative parts.

In a former application for patent, Serial No. 329,962, filed November 11, 1889, I have shown a general system of distribution of alternating currents, of which the one described in this application forms a special case. The general plan consists of a three-wire system of distribution from an alternating-current generator which is so contrived and connected to the external circuits that an alternating current traverses constantly a middle wire, while the plus or positive impulses of different waves are all carried by one of the side wires and all the negative impulses by the other. I have also shown in a former application, filed November 11, 1889, Serial No. 329,962, how an alternating current so distributed and subdivided can be used for charging storage-batteries at distant points from the source of current-supply. In the present application I desire to show and claim the special features of such a general system of distribution in which high-tension alternating currents are supplied to the mains from a central generating-station and at distant points are converted to direct currents of low tension, which may be used for operating any of the ordinary direct-current devices for lighting, driving motors, and other uses.

In the drawing, $Dy$ represents the generating-dynamo, the armature of which has its two terminals connected, one to a continuous ring $r^2$ and the other to two broken rings $r'$ and $r^3$, these latter having their insulating-spaces so placed with respect to the brushes and the field-poles of the generator that the main lead $M^2$, connected to the middle ring, has a true alternating current, while one side the main $M'$ conveys all the positive, and on the other the main $M^3$ all the negative, impulses of the same current. With these connections a system of low-tension direct-current distribution over distant local areas becomes possible with an alternating-current source of supply. Thus at distant points X and Y, as shown in the figure, storage-batteries $B' B^3$ at X and $B^2 B^4$ at Y are connected to main leads, as follows: A wire is taken from the middle main $M^2$ conveying an alternating current to the middle point of the batteries, and other wires are taken from the outside mains $M'$ and $M^3$ to the poles of the batteries, the lead conveying the positive impulses being connected to the plus pole and those conveying the negative impulses to the minus pole. It will be seen from an examination of the circuits that both these outside wires $M'$ and $M^3$ cannot be simultaneously closed through the common return $M^2$, from which it results that a plus wave is sent through one half of the battery from the lead $M'$, and then its circuit to the station through $M^2$ is opened, and that of $M^3$ being instantly closed sends the opposite impulse through the other half of the battery, each half receiving a charging-impulse in turn. In this manner the batteries are kept stored by the alternating current from a distant source of supply. These supplies of stored energy may be used to operate any direct-current devices that may be required, as the lamps 1 1 at station X, or the direct-current motor at station Y. At station Y a direct-current electric motor is shown in the same relation to the battery at that station as the lamps at station X. We thus have a complete system of low-tension direct-current distribution from a high-tension alternating-current source of supply. At the different stations where the batteries are used as transformers the middle main $M^2$, carrying both currents, has placed in circuit a suitable rheostat $Rh'$ and $Rh^2$, designed to reduce the potential to the proper point for charging the battery.

It is evidently not necessary to put batteries on both sides of the middle main $M^2$. In other words, it is not necessary to split the battery, as shown. Although such an arrangement is best calculated to use the current from the central station continuously from the three mains $M'$, $M^3$, and $M^2$, yet I do not wish to restrict my invention to so narrow an application.

It is apparent that a single row of batteries can be used having the main M² connected to one end or pole, and one of the side mains, as M³, connected to the other, as shown at Z, and this case would in many instances be the preferable arrangement. In this case the battery B⁵ at Z receives a series of intermittent impulses or waves all of like sign, just the same as does either half of the entire battery at the station X.

Having thus described my invention, what I claim, and desire to secure by Letters Patent, is the following:

1. A system of electric distribution comprising an alternating-current generator, a lead conveying an alternating current, other leads conveying, respectively, the positive and negative impulses of the same current, branch leads from the former connected to the middle points of storage-batteries placed at distant points, and branch leads from the latter connected to the poles of the same batteries.

2. In a system of electric distribution by means of alternating currents, a three-wire system of distribution with leads connected to storage-batteries, one of which, connected to a middle point of the battery, conveys alternating currents and the others to the poles conveying, respectively, the positive and negative impulses of the same current, whereby each half of the batteries is charged by each successive impulse of the alternating current in turn.

3. In a three-wire system of electric distribution, storage-batteries at distant points placed in circuit with the mains by connecting a middle point of the battery to a lead conveying an alternating current and the two terminals of the battery to other mains that carry, respectively, the positive and negative impulses of the same current.

4. The method of charging storage-batteries by means of an alternating current, which consists in carrying to a middle point of a storage-battery an alternating current and in conveying to the opposite poles, respectively, the positive and negative impulses of the same current.

5. In a system of electric distribution by means of alternating currents, storage-batteries having one pole connected to a main that conveys an alternating current and the other to a main that conveys only the positive or negative part of the same current.

6. In a system of electric distribution by means of alternating currents, storage-batteries having one pole connected to a main that conveys an alternating current and the other to a main that conveys only the positive or negative part of the same current, and circuits conveying from the storage-batteries direct currents for local distribution.

In testimony that I claim the foregoing as my invention I have hereunto set my hand, in the presence of two witnesses, this 27th day of November, 1889.

F. JARVIS PATTEN.

Witnesses:
W. M. MINER,
WM. W. THOMAS.